United States Patent [19]

Scheffer

[11] Patent Number: 4,563,589

[45] Date of Patent: Jan. 7, 1986

[54] ULTRAVIOLET CURING LAMP DEVICE

[76] Inventor: Herbert D. Scheffer, R.D. 2, Box 180A, Glen Gardner, N.J. 08826

[21] Appl. No.: 569,320

[22] Filed: Jan. 9, 1984

[51] Int. Cl.[4] .......................... G01J 1/00; F21V 29/00
[52] U.S. Cl. ................................... 250/504 R; 362/218
[58] Field of Search ............... 250/492.1, 493.1, 503.1, 250/504 R, 455.1; 362/218, 373; 313/44

[56] References Cited

U.S. PATENT DOCUMENTS

| | | | |
|---|---|---|---|
| 3,433,949 | 3/1969 | Truhan | 250/504 R |
| 3,819,929 | 6/1974 | Newman | 362/218 |
| 3,914,594 | 10/1975 | Helding | 362/218 |
| 3,950,650 | 4/1976 | Pray et al. | 250/504 R |
| 3,986,018 | 10/1976 | Ishii | 362/218 |
| 4,048,490 | 9/1977 | Trone | 362/263 |
| 4,053,759 | 10/1977 | Wilkinson | 362/218 |
| 4,055,769 | 10/1977 | Sander | 250/504 R |
| 4,220,865 | 9/1980 | Silverman | 250/504 R |
| 4,274,028 | 6/1981 | Frame | 313/101 |
| 4,298,806 | 11/1981 | Herold | 250/504 H |
| 4,309,616 | 1/1982 | Wolff | 250/494 |

*Primary Examiner*—Bruce C. Anderson
*Assistant Examiner*—Paul A. Guss
*Attorney, Agent, or Firm*—Kenneth P. Glynn

[57] ABSTRACT

The present invention device is used for curing photopolymerizable products and includes a converging type cold mirror, an ultraviolet light source, a heat absorber behind the cold mirror, a back deflector behind the heat absorber, and a blocker tube and an ultraviolet light permeable window located in front of the ultraviolet light source. The various elements are arranged so as to provide four different air channels (two longitudinal currents and two cross currents) for cooling, enabling the device to be operated at greatly reduced temperatures as compared to prior art air cooled devices.

5 Claims, 4 Drawing Figures

ULTRAVIOLET CURING LAMP DEVICE

BACKGROUND OF THE INVENTION

1. Field of the Invention

The present invention relates to an "ultraviolet curing lamp device" for the curing of organic compound products and especially photopolymerizable materials. It is particularly directed to such a device which may be operated at temperatures lower than the conventional air cooled devices and, is capable of curing a broader spectrum of products, some of which could not maintain their integrity at higher curing temperatures. Further, it is directed to a device which is air cooled rather than water cooled.

2. Prior Art Statement

The use of ultraviolet lamps for curing various organic compound materials is well known. Thus, photopolymerizable inks and plastics are cured upon exposure to ultraviolet radiation.

U.S. Pat. No. 4,309,616 is directed to an apparatus for producing ultraviolet radiation for treatment of humans but operates in the radiation range of 315 nm to 400 nm. The patent describes heat absorbing and intercepting means including an auxiliary reflector in front of a radiation source as well as an air cooling means located behind an ultraviolet light source reflector. While this patent is directed to ultraviolet light radiation, it does not have the requisite output for curing photopolymerizable materials and is directed to tanning humans. Thus, the patent fails to teach any of the physical improvements embodied in the present device of the invention.

U.S. Pat. No. 4,298,806 describes an apparatus for ultraviolet curing and includes air cooling means as well as an ellipsoidal reflector. However, this patent utilizes a long, curved optical wave guide and a thin film filter of titanium dioxide. The wave guide is designed to be bent at an angle such that cool ultraviolet light, i.e., radiation, is emitted. The present invention eliminates the need for a wave guide and enables much higher powered outputs to be utilized at substantially lowered temperatures.

U.S. Pat. No. 4,274,028 is directed to an apparatus for generating ultraviolet light of high intensity without heat production but requires a complex anode/cathode arrangement as well as vacuum-producing equipment. This patent teaches a device which is very different from that of the present invention. Due to the four different air currents utilized in the device of the present invention, this type of prior art evacuation as well as other prior art techniques such as water cooling, is eliminated.

U.S. Pat. No. 4,101,424 is directed to an ultraviolet lamp device employing a water jacket and heat exchanger to effect cooling. Again, unlike the present invention, this prior art requires water circulation. It should be noted that the present invention does not include a water circulation system, and, to make a comparison, in general, water circulation systems require plumbing, more expensive hardware, pumping, filtering, de-ionizing, and may create the potential for hazard due to the combination of high voltage or current being utilized in the same device through which water passes. As mentioned, all of these problems are eliminated by the present invention device.

U.S. Pat. No. 4,055,769 teaches a method and apparatus for curing a coating on a substrate wherein an ultraviolet light source is used in conjunction with a reflector which includes two opposite quarter circular concave sections and two partial parabolic sections. In this patent, hot mirrors such as aluminum which is vaporized with quartz, are used and the very low temperatures at high outputs which are achieved with the present invention cannot be obtained with this prior art device. In fact, the invention described in this patent is directed to a very narrow band of ultraviolet light and could not successfully be employed with broad band curing such as is used in the present invention.

U.S. Pat. No. 4,048,490 describes an apparatus for delivering a relatively cold ultraviolet light to a substrate for ultraviolet curing. While this patent teaches the use of dichroic reflective surfaces, it should be noted that these surfaces are flat and do not have focal points and, more importantly, are described in conjunction with a system which requires water cooling to lower the temperature of operation. As mentioned above, the use of water cooling systems creates many undesirable features which the present invention eliminates.

SUMMARY OF THE INVENTION

The present invention is directed to an ultraviolet device used for curing photopolymerizable materials. Its features include a cold mirror of the converging type having at least one focal point and located behind an ultraviolet light source, a heat absorber behind the cold mirror, a back deflector behind the heat absorber, and a blocker tube and an ultraviolet light permeable window located in front of the ultraviolet light source. These features are arranged so as to provide four different channels for cooling, thereby enabling the device to be operated at very low temperatures without the need for evacuation and without the need for water cooling. Specifically, a longitudinal current air channel is located inside of the blocker tube and a second longitudinal channel permits cooling air to pass over the outside of the blocker tube, over the window, with some air movement over the ultraviolet light source and the front of the cold mirror. Additionally, a first cross current of cooling air passes at a right angle to the longitudinal dimension of the ultraviolet light source between the cold mirror and the heat absorber and a second cross current passes between the heat absorber and the back deflector. Adequate air movement is provided so as to enable the device to be operated at greatly reduced temperatures, as measured at the focal point(s) of the cold mirror.

BRIEF DESCRIPTION OF THE DRAWINGS

Various other objects, features and attendant advantages of the present invention will be more fully appreciated as the same becomes better understood from the following detailed description in connection with the accompanying drawings, in which like reference characters designate like or corresponding parts through the several views and wherein.

DETAILED DESCRIPTION OF THE INVENTION

Figure 1:
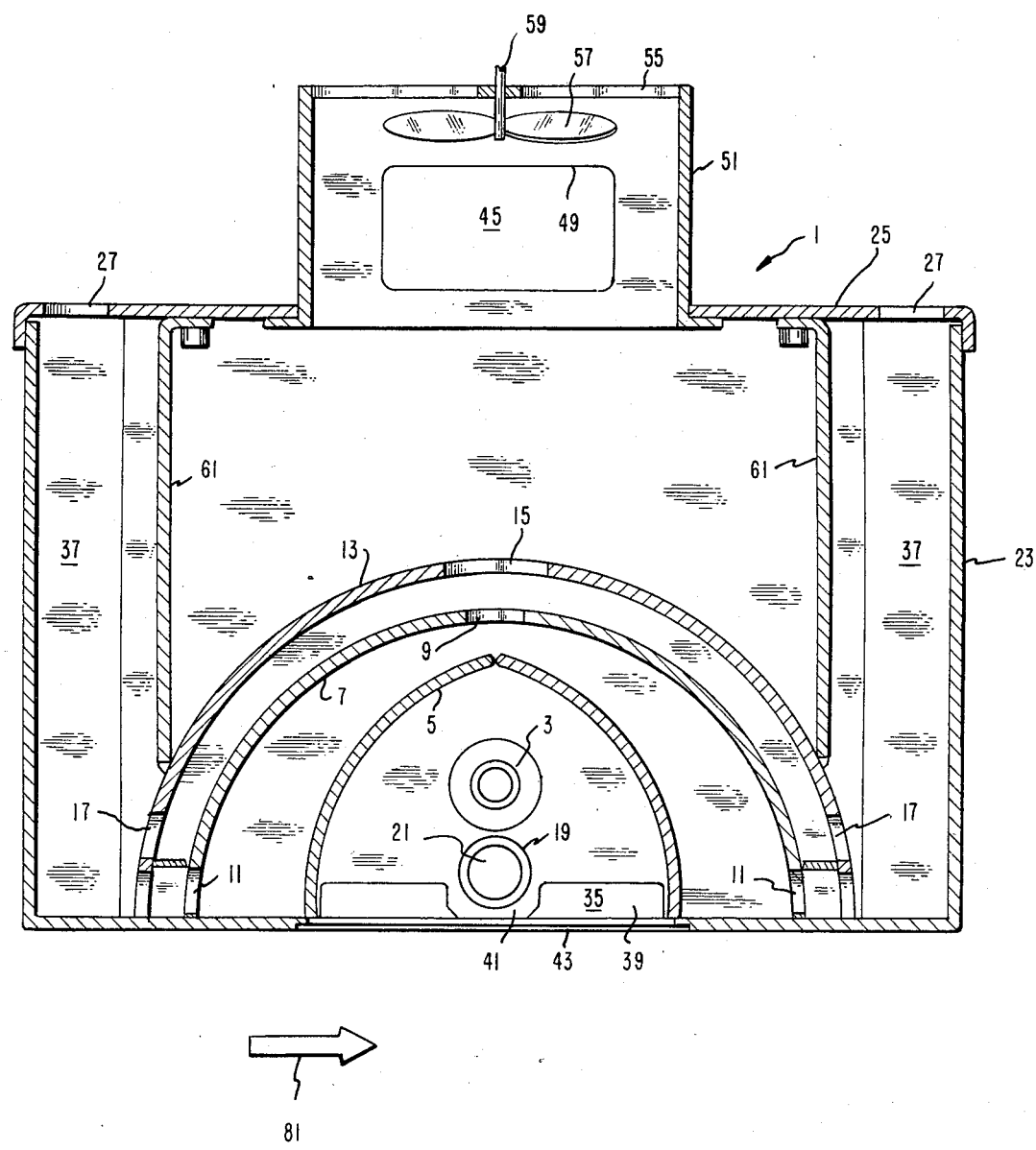
FIG. 1 is a cut sectional side view of one embodiment of the device of the present invention which shows two cross current air channels.
Figure 2:
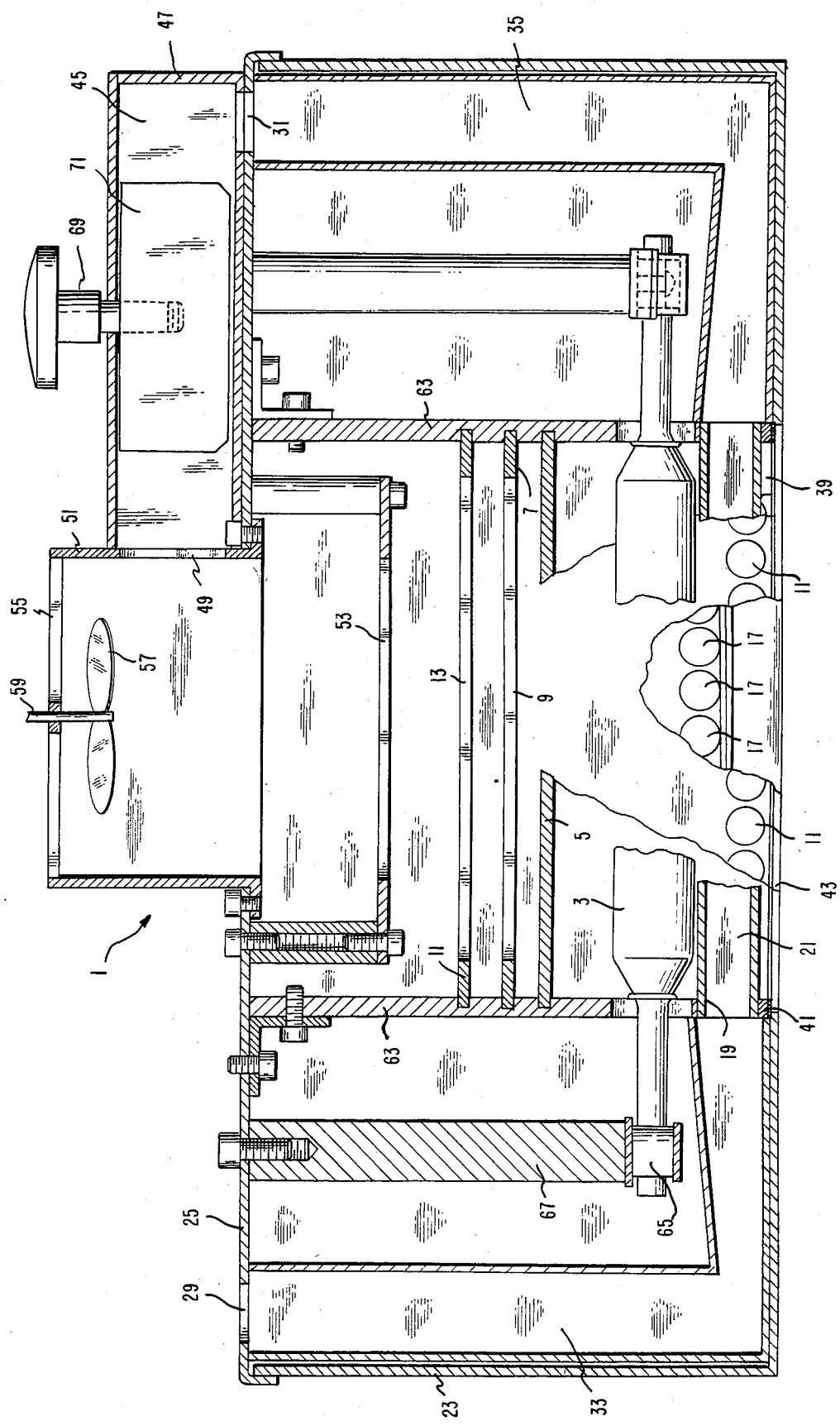
FIG. 2 is a cut sectional front view of one embodiment of a device of the present invention which shows two longitudinally current air channels.

In FIGS. 1 and 2, present invention device 1 contains within it an ultraviolet light source 3 which is a longitudinal, cylindrical bulb with its longitudinal dimension shown in FIG. 2. Cold mirror 5 is a converging mirror (e.g. parabolic or elliptical), shown here as two parabolic half sections each having one focal point onto which light converges. Cold mirror 5 is made of quartz and includes a multilayer dichroic filter to selectively reflect a broad band of ultraviolet light. Cold mirror 5 is located within device 1 in a longitudinally parallel relationship to ultraviolet light source 3 so as to selectively reflect ultraviolet light out of device 1 and through ultraviolet light permeable window 43, in this case, a quartz plate window.

Heat absorber 7 is shown within the device 1 and behind cold mirror 5 so as to place cold mirror 5 between it and ultraviolet light source 3. This creates an air space between the back of cold mirror 5 and the front of heat absorber 7. As shown, heat absorber 7 has an arcuated configuration running longitudinally parallel to ultraviolet light source 3. Heat absorber cross current outlet 9 and heat absorber cross current inlets 11 allow cross current air to flow over the back of cold mirror 5 and the front of heat absorber 7.

Back deflector 13 is also located within device 1 and is specifically located behind heat absorber 7 so as to place heat absorber 7 between cold mirror 5 and back deflector 13 and so as to create a space between heat absorber 7 and back deflector 13. Back deflector 13 has an arcuated configuration running longitudinally parallel to ultraviolet light source 3. Back deflector cross current inlets 17 and outlet 15 enable cross current air to pass over the back of heat absorber 7 and the front of back deflector 13.

Blocker tube 19 is located within device 1 between ultraviolet light source 3 and window 43. Blocker tube 19 is hollow and thus contains a longitudinal air current channel 21. Blocker tube 19 reflects ultraviolet, visible and infrared light which would otherwise pass straight through window 43 from ultraviolet light source 3 and thereby reduces non-ultraviolet light and heat from passing directly through quartz plate window 43.

Device 1 includes housing base 23 and housing cover 25. Also, a deflector chamber wall 61 (shown in FIG. 1) and support wall 63 (shown in FIG. 2) are contained within housing base 23 and housing cover 25.

FIG. 2 shows ultraviolet light source 3 connected to socket 65 and support 67, which support is attached to housing cover 25.

A first longitudinal current air channel 21 within blocker tube 19 permits cooling air to flow through it during operation of ultraviolet light source 3. A second longitudinal air channel 39 is connected within device 1 so as to permit cooling air to flow longitudinally over the outside of blocker tube 19, and over quartz plate window 43, with some air movement over ultraviolet light source 3 and the front surface of cold mirror 5. As illustrated in FIG. 2, inlet 29 provides air for channel 21 and channel 39 via conduit 33. Thus air enters at inlet 29, passes down conduit 33 and forms two longitudinal currents of air, one through channel 21 and one through channel 39. These two longitudinal currents converge again within outlet conduit 35 and then exit housing cover 35 via outlet 31. From outlet 31, the longitudinal currents air enters housing duct 45 enclosed by frame 47 and exits duct 45 via outlet 49 into exhaust chimney 51. As shown in FIG. 2, the longitudinal currents may be regulated by optional outlet regulator valve 69 which contols outlet regulator plate 71 to constrict passage through duct 45, as desired.

A first cross current air channel is, as mentioned, created between cold mirror 5 and heat absorber 7 and a second cross current air channel is created between heat absorber 7 and a back deflector 13. Air enters housing cover 25 via cross current inlets 27. The air passes over baffles 37 and enters the first cross current air channel via inlets 11, that air passes at a right angle to the longitudinal dimension of ultraviolet light source 3 between cold mirror reflector 5 and heat absorber 7, and exits via outlet 9. In addition, a portion of the air entering inlets 27 enters the second cross current air channel via inlets 17, passes at a right angle to the longitudinal dimension of ultraviolet light source 3 between heat absorber 7 and back deflector 13, and exits via outlet I5.

Blocker tube support plate 41 (actually the lower section of support wall 63) is shown with spacing at its base (FIG. 1) as well as spacing around ultraviolet light source 3 (FIG. 2). This enables the above-mentioned second longitudinal current air channel to simultaneously pass longitudinally about blocker tube 19, and over quartz plate window 43 as discussed above. However, it should be noted that other configurations of support plate 41 could be employed provided that adequate flow of the second longitudinal current could be achieved.

FIGS. 1 and 2 illustrate air movement means in exhaust chimney 51 which is capable of moving both of the longitudinal currents and both of the cross currents at a cooling rate so as to enable the operation of said ultraviolet light source at greatly reduced temperatures as measured at the cold mirror focal point. For example, in this embodiment, operation was possible at temperatures no greater than 320° F. when measured adjacent to the outside of quartz plate window 43 (the focal point, in this embodiment). Specifically, chimney inlet 53 (FIG. 2) allows exhaust from the cross currents to enter chimney 51 and outlet 49 allows exhaust from the longitudinal currents to enter chimney 51. All of the air currents are exhausted with exhaust fan 57 and exhaust fan shaft 59 which is connected to a power source (not shown) so as to adequately move these air currents through chimney outlet 55 to the at- mosphere.

Ultraviolet light curable organic compound product shown symbolically as arrow 81 in FIG. 1 moves at a right angle to the longitudinal dimension of ultraviolet light below quartz plate window 43 to effect the desired curing.

Figure 3:
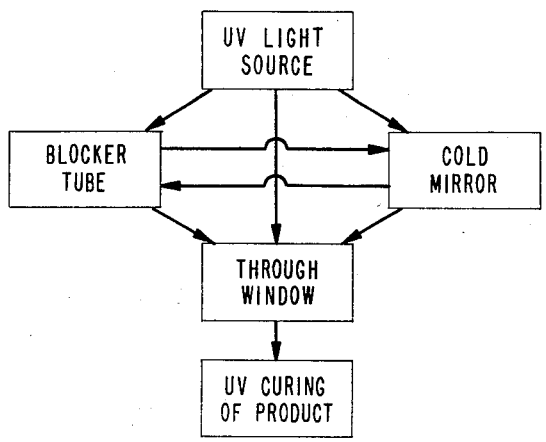
FIG. 3 illustrates schematically the possible ultraviolet light paths in a present invention device from the light source to the product to be cured; and, FIG. 4 illustrates the air flow paths for both the longitudinal currents and the cross currents in a device of the present invention.

FIG. 3 illustrates the possible paths for ultraviolet light source 3 in the device shown in FIGS. 1 and 2. Thus, the ultraviolet light may go to the blocker tube, to the cold mirror and through the window directly (albeit, at an angle). Ultraviolet light may deflect off the blocker tube to the cold mirror and vice versa, and then through the window. Ultraviolet light traveling through any of these paths may ultimately impinge upon the product which is to be cured to effect the desired curing results.

Figure 4:
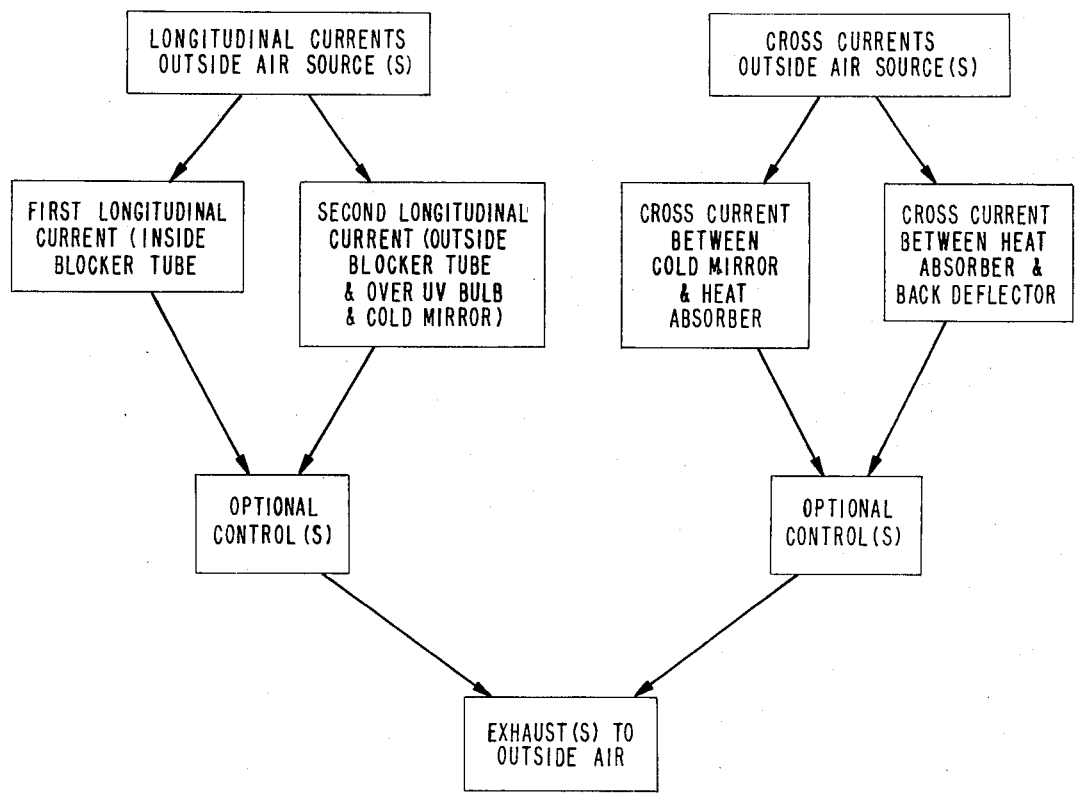

FIG. 4 merely illustrates schematically the cooling air paths utilized in a device of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A device for curing ultraviolet light curable organic compound products which comprises:

(a) an ultraviolet light housing which includes an ultraviolet light permeable window;

(b) an ultraviolet light source of a longitudinal cylindrical nature contained within said housing;

(c) a cold mirror of the converging type having at least one focal point and being comprised of quartz with a multi-layer dichroic filter thereon to selectively reflect a broad band of ultraviolet light, and to transmit a high percentage of visible and infrared light, said cold mirror being contained within said housing in a longitudinally parallel relationship to said ultraviolet light source so as to selectively reflect ultraviolet light out of said housing through said window and to transmit visible and infrared light through said cold mirror, said cold mirror having its front surface facing said ultraviolet light source;

(d) an arcuated heat absorber located within said housing and behind said cold mirror so as to place said cold mirror between said heat absorber and said ultraviolet light source and so as to create an air space between the back of said cold mirror and the front of said heat absorber, said heat absorber having arcuated configuration running longitudinally parallel to said ultraviolet light source;

(e) an arcuated back deflector located within said housing and behind said heat absorber so as to place said heat absorber between said cold mirror and said back deflector and so as to create a space between said heat absorber and said back deflector, said back deflector having an arcuated configuration running longitudinally parallel to said ultraviolet light source;

(f) a blocker tube which is located within said housing and between said ultraviolet light source and said window, so as to reflect ultraviolet, visible and infrared light and so as to reduce non-ultraviolet light and heat from passing directly through said window;

(g) a first longitudinal current air channel contained within said housing so as to permit cooling air to flow longitudinally through the inside of said blocker tube;

(h) a second longitudinal current air channel contained within said housing so as to permit cooling air to flow longitudinally over the outside of said blocker tube, over said window and to some extent longitudinally over said ultraviolet light source and said front surface of said cold mirror;

(i) a first cross current air channel contained within said housing so as to permit cooling air to flow between said cold mirror and said heat absorber as a cross current at a right angle to the longitudinal dimension of said ultraviolet light source;

(j) a second cross current air channel contained within said housing so as to permit cooling air to flow between said heat absorber and said back deflector as a cross current at a right angle to the longitudinal dimension of said ultraviolet light source; and, (k) one or more air movement means capable of moving both of said longitudinal currents and both of said cross currents at a cooling rate so as to enable the operation of said ultraviolet light source at greatly reduced temperatures when measured at the focal point(s) of said cold mirror.

2. The device of claim 1 wherein said cold mirror of the converging type comprises at least one parabolic section.

3. The device of claim 1 wherein said ultraviolet light permeable window is a quartz plate window.

4. The device of claim 2 wherein said ultraviolet light permeable window is a quartz plate window.

5. The device of claim 1 wherein a single air movement means is utilized and comprises an exhaust fan which pulls said air currents through said device.

* * * * *